United States Patent Office 3,267,095
Patented August 16, 1966

3,267,095
PROCESS FOR THE PREPARATION OF 3,4-DIHYDRO-1,2,4-BENZOTHIADIAZINE-1,1-DIOXIDES
Richard Bennett Margerison, Florham Park, Anthony Charles Shabica, Livingston, and John Benjamin Ziegler, Summit, N.J., assignors to Ciba Corporation, New York, N.Y., a corporation of Delaware
No Drawing. Filed July 24, 1962, Ser. No. 212,125
5 Claims. (Cl. 260—243)

The present application is a continuation-in-part application of our application Serial No. 812,579, filed May 12, 1959 (now U.S. Patent No. 3,095,446, issued June 25, 1963), which in turn is a continuation-in-part application of our application Serial No. 763,806, filed September 29, 1958 (now abandoned), which in turn is a continuation-in-part application of our application Serial No. 752,165, filed July 31, 1958 (now abandoned).

This invention concerns a new process for the preparation of certain 3,4-dihydro-2H-1,2,4-benzothiadiazine-1,1-dioxides. More particularly, it relates to process for the preparation of 7-sulfamyl-6-$R_3$-3,4-dihydro-2H-1,2,4-benzothiadiazine-1,1-dioxides, in which the nitrogen atom of the sulfamyl group may be unsubstituted or substituted, and $R_3$ stands for lower alkyl, polyhalogeno-lower alkyl, or particularly halogeno.

The preparation of the 3,4-dihydro-2H-1,2,4-benzothiadiazine-1,1-dioxides according to the process of this invention includes particularly the manufacture of 7-N—$R_2'$-sulfamyl-2-$R_2'$-3-$R_1$-4-$R_2''$-6-$R_3$-3,4 - dihydro-2H-1,2,4-benzothiadiazine-1,1-dioxides, in which $R_1$ represents hydrogen, lower alkyl, substituted lower alkyl, lower alkenyl, cycloalkyl, cycloalkenyl, cycloalkyl-lower alkyl, cycloalkenyl-lower alkyl, carbocyclic aryl carbocyclic aryl-lower alkyl, heterocyclic aryl or heterocyclic-lower alkyl, each of the radicals $R_2'$ and $R_2''$ stands for hydrogen or lower alkyl, and $R_3$ has the above-given meaning. These compounds may, therefore, be represented by the following formula:

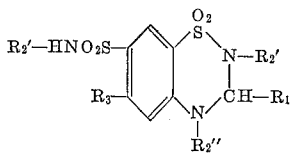

in which $R_1$, $R_2'$, $R_2''$ and $R_3$ have the above-given meaning.

Apart from being hydrogen, $R_1$ may also stand for lower alkyl, e.g. methyl, ethyl, propyl, isopropyl, butyl, isobutyl, secondary butyl, tertiary butyl, pentyl, isopentyl, neopentyl and the like. The substituents of substituted lower alkyl radicals are particularly halogeno, e.g. fluoro, chloro or bromo; halogeno-lower alkyl radicals are, therefore, represented, for example, by trifluoromethyl, chloromethyl, dichloromethyl, trichloromethyl, bromomethyl or 2-chloroethyl. Other substituents are, for example, hydroxyl, etherified hydroxyl, such as lower alkoxy, e.g. methoxy, ethoxy and the like, or monocyclic carbocyclic aryloxy, e.g. phenoxy and the like, lower alkyl-mercapto, e.g. methylmercapto, ethylmercapto and the like, lower alkanoyl, e.g. acetyl and the like, or amino, especially tertiary amino, such as N,N,-di-lower alkylamino, e.g. N,N-dimethylamino, N,N-diethylamino and the like.

Lower alkenyl radical representing $R_1$ is, for example, 1-propenyl and the like. Cycloalkyl and cycloalkenyl radicals representing the substituent in the 3-position, have preferably from five to six carbon atoms and may be represented, for example, by cyclopentyl, cyclohexyl, 3-cyclohexenyl and the like. The cycloalkyl and cycloalkenyl portions of cycloalkyl-lower alkyl or cycloalkenyl-lower alkyl have preferably from five to six carbon atoms; the radicals are represented by cyclopentylmethyl, 1-cyclopentylethyl, cyclohexylmethyl, 2-cyclohexylethyl and the like.

Carbocyclic aryl radicals are primarily monocyclic carbocyclic aryl, e.g. phenyl and substituted phenyl, whereas carbocyclic aryl-lower alkyl may be represented by monocyclic carbocyclic aryl-lower alkyl, such as phenyl-lower alkyl, e.g. benzyl, 2-phenylethyl and the like, or the corresponding substituted phenyl-lower alkyl radicals. Substituents of the phenyl portion are, for example, lower alkyl, e.g. methyl, ethyl and the like, halogeno, e.g. fluoro, chloro, bromo and the like, lower alkoxy, e.g. methoxy, ethoxy and the like, lower alkylenedioxy, e.g. methylenedioxy and the like, lower alkyl-mercapto, e.g. methylmercapto, ethylmercapto and the like, amino, particularly tertiary amino, such as N,N-di-lower alkylamino, e.g. N,N-dimethylamino and the like.

Heterocyclic aryl radicals are primarily monocyclic heterocyclic aryl radicals, which contain nitrogen, sulfur or oxygen as hetero atoms of the heterocyclic nucleus; such radicals are, for example, pyridyl, e.g. 2-pyridyl, 3-pyridyl, 4-pyridyl and the like, thienyl, e.g. 2-thienyl, or furyl, e.g. 2-furyl. Heterocyclic aryl-lower alkyl radicals are primarily monocyclic heterocyclic aryl-lower alkyl radicals, in which the heterocyclic radical may be identical with those previously hereinabove; the 2-thenyl radical represents such a substituent $R_1$.

The radicals $R_2'$ and $R_2''$ are primarily hydrogen, but may also stand for lower alkyl, e.g. methyl, ethyl and the like.

The radical $R_3$ stands primarily for halogeno, e.g. fluoro, bromo, iodo, or particularly chloro. It may also represent lower alkyl, e.g. methyl, ethyl and the like, or halogeno-lower alkyl, e.g. trifluoromethyl.

The 3,4-dihydro - 2H - 1,2,4-benzothiadiazine-1,1-dioxides formed by the new process of this invention show diuretic and natriuretic effects and may be used as diuretic and natriuretic agents to relieve excessive water and/or salt retention, for example, in connection with heart or kidney diseases. They also have antihypertensive effects, which may be utilized to relieve states of hypertension.

3,4 - dihydro-2H-1,2,4-benzothiadiazine-1,1-dioxides of the above type may be prepared by treating an aniline compound of the formula:

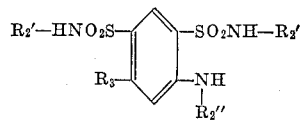

in which $R_2'$, $R_2''$ and $R_3$ have the above-given meaning, with an aldehyde of the formula $R_1CHO$, in which $R_1$ has the above-given meaning, or a derivative of such an aldehyde. The starting materials used in this reaction are prepared by treating a 3-$R_3$—N—$R_2''$-aniline with chlorosulfonic acid to form the 5-$R_3$—N—$R_2''$-aniline-2,4-disulfonyl chloride, which is then reacted with ammonia, preferably in the form of aqueous ammonium hydroxide or liquid ammonia, or with a primary amine, for example, a lower alkylamine, e.g. methylamine, ethylamine and the like.

An additional possibility of preparing compounds of this invention comprises reducing in 1,2,4-benzothiadiazine compounds of the formulae:

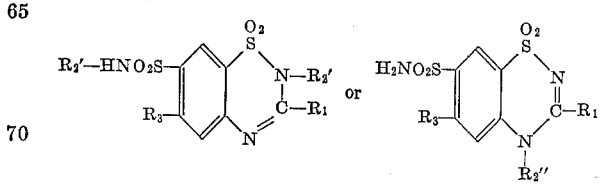

in which $R_1$, $R_2'$, $R_2''$ and $R_3$ have the above-given meaning, the C=N— double bond of the 1,2,4-thiadiazine portion. Such reduction may be carried out, for example, by treatment with an alkali metal borohydride, e.g. sodium borohydride. Certain starting materials used in this reaction, for example, those, in which $R_1$ stands for hydrogen, may be prepared by treating a 3-$R_3$—N—$R_2''$-aniline with chlorosulfonic acid, reacting the resulting 5-$R_3$—N—$R_2''$-aniline-2,4-disulfonyl chloride with ammonia or a primary amine as described above and ring-closing the resulting 2,4-disulfamyl-5-$R_3$—N—$R_2''$-aniline with formic acid or a lower alkyl orthoformate, e.g. ethyl orthoformate, to the desired 1,2,4-benzothiadiazine-1,1-dioxides.

We have now found that the 3,4-dihydro-2H-1,2,4-benzothiadiazine-1,1-dioxides described hereinabove can be prepared from 5-$R_3$—N—$R_2''$-aniline 2,4-disulfonyl chlorides directly and without isolating a 2,4-disulfamyl-aniline derivative. This may be achieved by reacting an aniline compound of the formula:

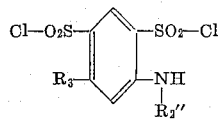

in which $R_2''$ and $R_3$ have the above-given meaning, with an aldehyde of the formula $R_1$—CHO, in which $R_1$ has the above-given meaning, or a reactive derivative thereof in the presence of hydrogen chloride, and subsequently with a compound of the formula $R_2'$—$NH_2$, in which $R_2'$ has the above-given meaning.

The reaction is preferably carried out in the presence of a diluent, for example, an organic solvent, such as an ether, e.g. diethyleneglycol dimethylether, p-dioxane and the like, an aromatic hydrocarbon, e.g. benzene, toluene and the like, a halogenated lower aliphatic hydrocarbon, e.g. tetrachloroethane and the like, or any other analogous solvent, which is inert towards an aldehyde in the presence of an acid, and/or in which the reactants are soluble.

The aldehyde of the formula $R_1$—CHO, in which $R_1$ has the above-given meaning, may be used as such or in the form of a derivative thereof, such as, for example, as an acetal with a lower alkanol, e.g. methanol, ethanol and the like. Formaldehyde itself may be used in the form of a reactive derivative thereof, such as a polymer, e.g. trioxane, paraformaldehyde and the like, or an acetal, e.g. dimethoxymethane, diethoxymethane and the like, or in the form of any other source furnishing formaldehyde, such as, for example, hexamethylenetetramine, chloromethyl methyl ether and the like. Hydrogen chloride is preferably used in gaseous form and, if necessary, in excess amounts in order to assure the formation of an intermediarily formed N-chloro-alkylated aniline derivative. The reaction may be performed under cooling, at room temperature or at an elevated temperature, for example, at the boiling temperature of the solvent. It is preferably performed in the absence of water; traces of the latter, however, do not influence the reaction.

The second reactant of the formula $R_2'$—$NH_2$, in which $R_2'$ has the above-given meaning, may be added to the reaction mixture in gaseous form, or in solution, for example, in one of the solvents used in the first phase of the reaction. The solvent employed during the latter may be removed and replaced by another diluent; however, the same solvent is preferably used during both stages.

The treatment with the reagent of the formula $R_2'$—$NH_2$ may be carried out under cooling, a room temperature or at an elevated temperature. Prior to adding the reactant $R_2'$—$NH_2$ to the reaction mixture, an excess of hydrogen chloride present in the latter is preferably removed, in order to avoid a loss of the reactant by neutralization with the acid. This removal may be accomplished, for example, by elevating the temperature and/or reducing the pressure in the reaction vessel.

The product obtained according to the process of this invention may be isolated and purified according to ordinary isolation procedures, for example, precipitation, crystallization and/or recrystallization.

A preferred embodiment of this invention, which is directed to the formation of 3,4-dihydro-2H-1,2,4-benzothiadiazine-1,1-dioxides of the formula:

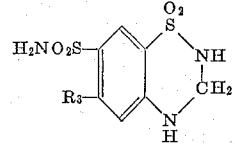

in which $R_3$ stands for methyl, trifluoromethyl, or halogeno, particularly chloro, comprises treating a compound of the formula:

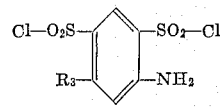

in which $R_3$ has the above-given meaning, with formaldehyde, especially in the form of a polymer thereof, e.g. paraformaldehyde, in the presence of hydrogen chloride and subsequently with ammonia; the latter step is preferably carried out after the removal of an excess of hydrogen chloride. For example, by reacting 5-chloro-aniline 2,4-disulfonyl chloride with paraformaldehyde in the presence of hydrogen chloride at room temperature, removing the excess of hydrogen chloride and treating the reaction mixture with ammonia at room temperature, the desired 6-chloro-7-sulfamyl-3,4-dihydro-2H-1,2,4-benzothiadiazine-1,1-dioxide can be obtained in excellent yields.

The invention also comprises any modification of the general process wherein a compound resulting as an intermediate at any stage of the process of the invention, is used as starting material and reaction with the remaining reactant carried out, as well as any new intermediates. Thus, intermediates of the formula:

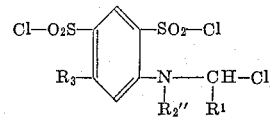

in which $R_1$, $R_2''$ and $R_3$ have the above-given meaning, and which are formed by treating the 5-$R_3$—N—$R_2''$-aniline-2,4-disulfonyl chloride with an aldehyde of the formula $R_1$—CHO in the presence of hydrogen chloride, and their addition salts with hydrochloric acid, are new and are intended to be included within the scope of the invention. They can be used as intermediates for the preparation of the 3,4-dihydro-2H-1,2,4-benzothiadiazine-1,1-dioxides having the diuretic and natriuretic properties; the conversion into the latter may be achieved by treatment of the intermediate compound with a reagent of the formula $R_2'$—$NH_2$, in which $R_2'$ has the previous meaning, according to the above-given conditions. Particularly suitable as intermediates are the compounds of the formula:

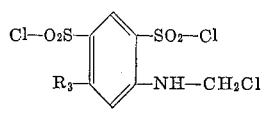

in which R stands for methyl, trifluoromethyl or halogeno, particularly chloro. 5-chloro-N-chloromethyl-aniline 2,4-disulfonyl chloride represents this group of compounds.

The following examples illustrate the invention; they are not to be construed as being limitations thereon. Temperatures are given in degrees centigrade.

Example 1

Gaseous hydrogen chloride is bubbled through a stirred suspension of 0.46 g. of paraformaldehyde in a solution of 5.0 g. of 5-chloro-aniline 2,4-disulfonyl chloride in 25 ml. of diethyleneglycol dimethylether for one hour at room temperature. The resulting solution is heated to 50° for ten minutes. The excess gaseous hydrogen chloride is removed under reduced pressure leaving the solution of the intermediarily formed 5-chloro-N-chloromethylaniline 2,4-disulfonyl chloride in diethyleneglycol dimethylether.

Anhydrous ammonia is passed through the solution while stirring and cooling until the reaction mixture is basic. It is warmed to 45°, filtered to remove the precipitated ammonium chloride, and the 6-chloro-7-sulfamyl-3,4-dihydro-2H-1,2,4-benzothiadiazine-1,1-dioxide is precipitated by concentrating the filtrate under reduced pressure and adding 35 ml. of water. The crude product is recrystallized from aqueous methanol, M.P. 267–272°.

By reacting 5-methyl-aniline 2,4-disulfonyl chloride or 5-trifluoromethyl-aniline 2,4-disulfonyl chloride with paraformaldehyde in the presence of hydrogen chloride and subsequently with ammonia according to the above procedure, the 6-methyl-7-sulfamyl-3,4-dihydro-2H-1,2,4-benzothiadiazine-1,1-dioxide and the 7-sulfanyl-6-trifluoromethyl-3,4-dihydro-2H-1,2,4-benzothiadiazine-1,1-dioxide, respectively, may be formed.

Example 2

A solution of 10 g. of 5-chloro-aniline 2,4-disulfonyl chloride and 2.48 g. of chloromethyl methyl ether in 70 ml. of diethyleneglycol dimethylether, kept between 20° and 30°, is treated with hydrogen chloride gas while stirring. After one hour the temperature is raised to 50° during a ten minute period; the reaction mixture is then cooled and kept at room temperature while dry air is bubbled through the solution during twenty-five minutes and while a partial vacuum is kept in the reaction vessel.

The solution is cooled in an ice-bath and gaseous ammonia is passed through the solution at temperatures between 10° and 30° for about fifty-five minutes. The now basic reaction mixture is allowed to stand for one hour, the precipitate, consisting largely of ammonium chloride is filtered off and washed with an additional 30 ml. of diethyleneglycol dimethylether. About 60 ml. of the solvent is evaporated from the combined filtrates, the residue is diluted with 70 ml. of water and the solid precipitate, containing the 6-chloro-7-sulfamyl-3,4-dihydro-2H-1,2,4-benzothiadiazine-1,1-dioxide is filtered off. The product, obtained after recrystallization from a mixture of water and methanol, is identical with the product described in Example 1.

Example 3

Gaseous hydrogen chloride is passed through a suspension of 0.46 g. of paraformaldehyde and 5.09 of 5-chloro-aniline 2,4-disulfonyl chloride in 25 ml. of diethyleneglycol dimethylether and 5 g. of water; the reaction is carried out at room temperature and while stirring thoroughly and is terminated after one hour. The resulting solution is then heated to 50° during ten minutes and the excess hydrogen chloride removed under reduced pressure. While stirring and cooling, ammonia is passed into the reaction mixture until it is made basic, whereupon it is heated to 50°. The ammonium chloride is filtered off, and the desired 6-chloro-7-sulfanyl-3,4-dihydro-2H-1,2,4-benzothiadiazine-1,1-dioxide is precipitated by concentrating the filtrate under reduced pressure and diluting it with 35 ml. of water; it is recrystallized several times from methanol and melts at 267–272°.

What is claimed is:

1. Process for the preparation of a 3,4-dihydro-2H-1,2,4-benzothiadiazine-1,1-dioxide of the formula:

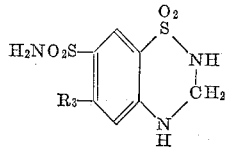

in which $R_3$ represents a member of the group consisting of lower alkyl, polyhalogeno-lower alkyl and halogeno, which comprises treating an aniline derivative of the formula:

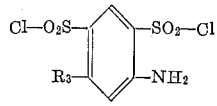

in which $R_3$ has the previously given meaning, with a member selected from the group consisting of formaldehyde, the acetal of formaldehyde with a lower alkanol, a polymer of formaldehyde, hexamethylene-tetramine and chloromethyl methyl ether, in the presence of hydrogen chloride, and subsequently with ammonia.

2. Process according to claim 1, wherein formaldehyde is used in the form of a polmyer thereof.

3. Process according to claim 2, wherein formaldehyde is used in the form of paraformaldehyde.

4. Process for the preparation of 6-chloro-7-sulfamyl-3,4-dihydro-2H-1,2,4-benzothiadiazine-1,1-dioxide, which comprises treating 5-chloro-aniline-2,4-disulfonyl chloride with paraformaldehyde in the presence of hydrogen chloride and subsequently with ammonia.

5. Process according to claim 4, which comprises removing an excess of hydrogen chloride prior to treatment with ammonia.

References Cited by the Examiner

UNITED STATES PATENTS 2,910,475   10/1959   Novello _____ 260—293 XR

OTHER REFERENCES

Freeman et al., J. Org. Chem., vol. 16, pp. 813–825 (1951).

NICHOLAS S. RIZZO, *Primary Examiner.*